Aug. 24, 1948.  C. E. RATCHFORD  2,447,770
COMBINATION JAR WRENCH AND HOLDER
Filed July 13, 1944  2 Sheets-Sheet 1

INVENTOR.
Charles E. Ratchford
BY Victor J. Evans & Co.
ATTORNEYS

Aug. 24, 1948.   C. E. RATCHFORD   2,447,770
COMBINATION JAR WRENCH AND HOLDER
Filed July 13, 1944   2 Sheets-Sheet 2

INVENTOR.
Charles E. Ratchford
BY Victor J. Evans & Co.
ATTORNEYS

Patented Aug. 24, 1948

2,447,770

UNITED STATES PATENT OFFICE 2,447,770

COMBINATION JAR WRENCH AND HOLDER

Charles E. Ratchford, Long Beach, Calif.

Application July 13, 1944, Serial No. 544,683

1 Claim. (Cl. 81—3.36)

The invention relates to a jar wrench, and more especially to a jar wrench and holder.

The primary object of the invention is the provision of an implement of this character, wherein the screw cover or cap and the body of the jar can be firmly and securely held, so that the said cover or cap can be conveniently removed, and also the jar held during the removal of such cap or cover, the clamping of the latter being effected in a unique and novel manner.

Another object of the invention is the provision of an implement of this character, wherein there can be no damage to the jar while removing the cover or cap therefrom, and the latter may be removed with dispatch and ease, or such cover or cap can be tightened on the said jar optionally with the user of the implement.

A further object of the invention is the provision of an implement of this character, wherein it can be applied and removed without trouble, and when applied embraces both the cover or cap and the jar, so that these can be conveniently held during the working of the implement, there being separate operating members for the cover or cap and the jar, which are hand controlled.

A still further object of the invention is the provision of an implement of this character, wherein the clamping of the cover or cap and the jar are independent of each other, and are similarly regulated.

A still further object of the invention is the provision of an implement of this character, which is simple in construction, thoroughly reliable and efficient in operation, readily and easily applied and removed, strong, durable, conveniently actuated, without excessive exertion on the part of a user, assuring against injury through breaking of the jar, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings.

Similar reference characters indicate corresponding parts throughout the several views in the drawings.

Figure 1:
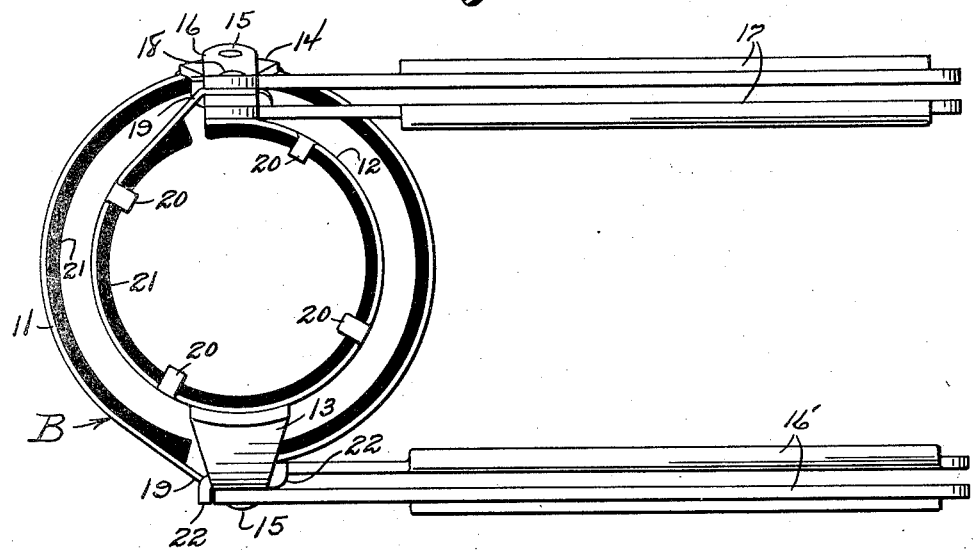
Figure 1 is a top plan view of the implement constructed in accordance with the invention and applied to a jar.

Referring to the drawings in detail A designates generally a portion of a jar of the fruit or vegetable containing type, having a screw threaded cover or cap 10, while B denotes generally the implement constituting the present invention, and is in the form of a jar wrench and holder, as will be hereinafter fully described.

The implement B comprises a split expansible and contractible jar-body embracing band 11, and split expansible and contractible cover or cap embracing band 12, which is smaller in diameter than the said band 11 due to the size of the cover or cap 10. The split areas of the bands 11 and 12 are arranged on reverse sides of the implement B in its entirety.

The band 12 opposite the split therein has built thereon at its lowermost edge a curved laterally extending and depending ear 13, while the band 11 similarly has built thereon opposite its split area an upstanding ear 14 at its uppermost edge, these ears 13 and 14, being fitted with pivot connections 15 for the toggle link heads 16 of upper and lower pairs of operating levers 16' and 17, respectively. The levers with the head formations are of substantially T-shape.

The link heads 16 of the respective pairs of levers 16' and 17 are pivotally connected at 18 to the ends adjacent thereto of the bands 11 and 12, one each of these ends 19 of the latter are outwardly offset to clear the other end next thereto, for the proper expansion and contraction of each band without interference of its ends at the split area.

The band 12 at its top edge carries inturned rest ears or lugs 20 for contacting with the top portion of the cover or cap 10.

The bands 11 and 12 at their inner faces are fitted with resilient linings 21, so as to avoid damaging the jar or cap in the use of the implement B.

Figure 2:
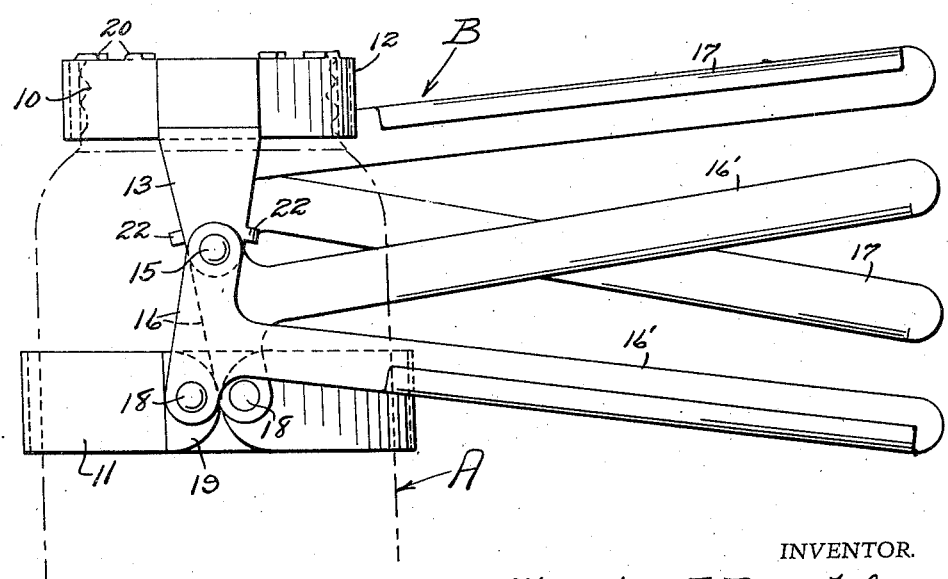
Figure 2 is a side view thereof, in an applied position.
Figure 3:
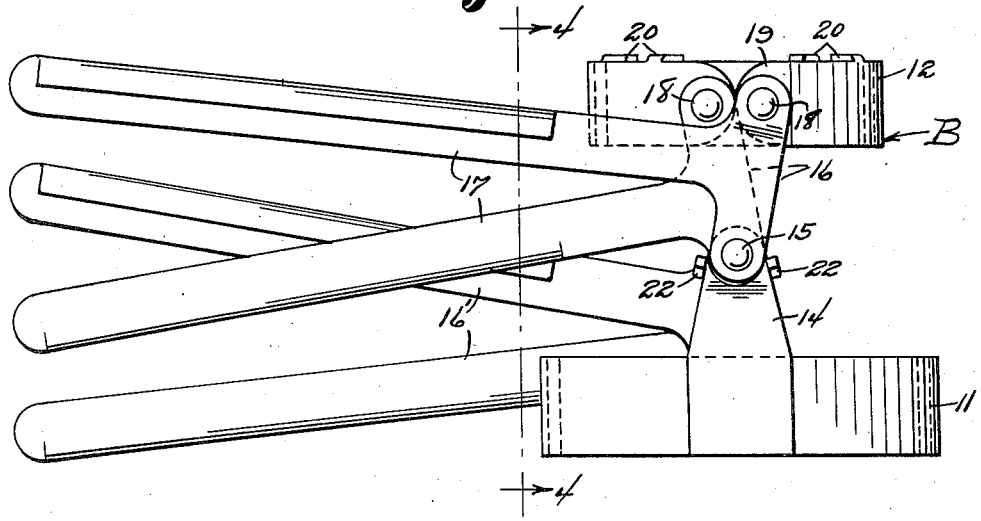
Figure 3 is a side view of the implement removed from the jar.
Figure 4:
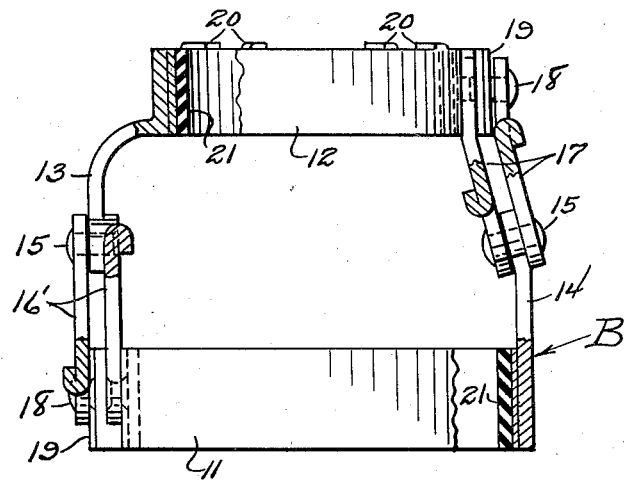
Figure 4 is a sectional view taken on the line 4—4 of Figure 3 looking in the direction of the arrows.

In the use of the implement B the same is applied as best shown in Figures 1 and 2 of the drawings. The clamping of the jar and cover or cap is effected by actuating the pairs of levers 16' and 17, respectively. The ears 13 and 14 are provided with stops 22 to limit the throw of the levers 16' and 17, when actuated. The bands 11 and 12 when contracted firmly and securely clamp the jar and cover or cap, while the expansion of these bands releases the same.

The pair of levers 17 is gripped in the right hand, which contracts the cap engaging member 12, so that it securely grips the cap. At the same time, the pair of levers 16' is gripped in the left hand, which contracts the jar engaging member 11, so that it securely grips the jar. Then the right hand with levers 17 is raised, while at the same time the left hand with levers 16 is lowered. Through this motion, levers 17 force the right side of cap engaging member away from the operator, and levers 16' force the left side of the cap engaging member toward the operator, thus causing the cap engaging member, with cap, to rotate in a counterclockwise direction. If the hands are moved in the opposite direction, the cap will be turned in a clockwise direction. The ears 13 and 14, and the link heads 16, where they connect to the ears, are bent at a slightly different angle, as shown in Figure 1, so that the cap-engaging member can rotate freely without any binding. It is only intended that the cap engaging member move a short distance sufficient to loosen a tight cap, or to tighten a loose cap.

From the foregoing it is thought that the construction and manner of operation of the implement will be clearly understood, and therefore a more extended explanation has been omitted for the sake of brevity.

What is claimed is:

An implement of the kind described, comprising a split jar body embracing band, a split jar cap embracing band parallel to and positioned above said body embracing band, a curved laterally extending and depending ear on said cap embracing band at the center thereof opposite to the split ends thereof, an upstanding ear on said body embracing band at the center thereof opposite to the split ends thereof, the ears on said bands being positioned in opposed relation to each other, a plurality of handles separated into pairs and having T-shaped heads on one end thereof, one end of the heads of one pair being pivotally connected to the ear on said body embracing band, one end of the heads of the other pair being pivotally connected to the ear on said embracing band, the other ends of the T-heads pivoted on the ear on the cap embracing band being pivoted to the split ends respectively of the body embracing band, the other ends of the T-heads pivoted on the ear on the body embracing band being pivoted to the split ends respectively of the cap embracing band, said handles being adapted to be grasped in pairs and moved toward each other to cause a torque couple to be applied to the jar and cap to cause the cap and jar to be moved slightly in opposite directions to loosen the cap from the jar.

CHARLES E. RATCHFORD.

REFERENCES CITED

The following references are of record in the file of this patent:

UNITED STATES PATENTS

| Number | Name | Date |
| --- | --- | --- |
| 580,268 | Gartelman | Apr. 6, 1897 |
| 694,748 | Himmelman | Mar. 4, 1902 |
| 1,277,351 | Ahrens | Sept. 3, 1918 |
| 1,521,342 | Thomas | Dec. 30, 1924 |
| 2,057,614 | Girard | Oct. 13, 1936 |